United States Patent
Chowdhury et al.

(10) Patent No.: US 6,977,380 B2
(45) Date of Patent: Dec. 20, 2005

(54) LOW NOISE, LONG INTEGRATION TIME ACQUISITION FOR RADIATION DETECTORS

(75) Inventors: Samir Chowdhury, Chicago, IL (US); John C. Engdahl, Lake Forest, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 241 days.

(21) Appl. No.: 10/261,250

(22) Filed: Sep. 30, 2002

(65) Prior Publication Data

US 2004/0061062 A1 Apr. 1, 2004

(51) Int. Cl.$^7$ ................................................ G01T 1/24
(52) U.S. Cl. ...................................... 250/370.11
(58) Field of Search ................................ 250/370.11

(56) References Cited

U.S. PATENT DOCUMENTS

| | | | | |
|---|---|---|---|---|
| 4,727,256 A | * | 2/1988 | Kumazawa | 250/370.1 |
| 6,351,519 B1 | * | 2/2002 | Bonk et al. | 250/370.11 |
| 6,521,894 B1 | * | 2/2003 | Iwanczyk et al. | 250/370.11 |
| 6,552,745 B1 | * | 4/2003 | Perner | 348/308 |

* cited by examiner

Primary Examiner—Constantine Hannaher

(57) ABSTRACT

A method and apparatus for improving the energy resolution, sensitivity and other aspects of a x-ray or gamma ray detector by using modified acquisition electronics in conjunction with low leakage current photodiodes. Specifically, increasing the integration time of the sample circuits without degrading energy resolution due to parallel noise in order to improve energy resolution and sensitivity, and to allow new electronics designs.

19 Claims, 6 Drawing Sheets

CsI/PHOTODIODE ENERGY RESOLUTION

CsI/Si PHOTODIODE ENERGY RESOLUTION

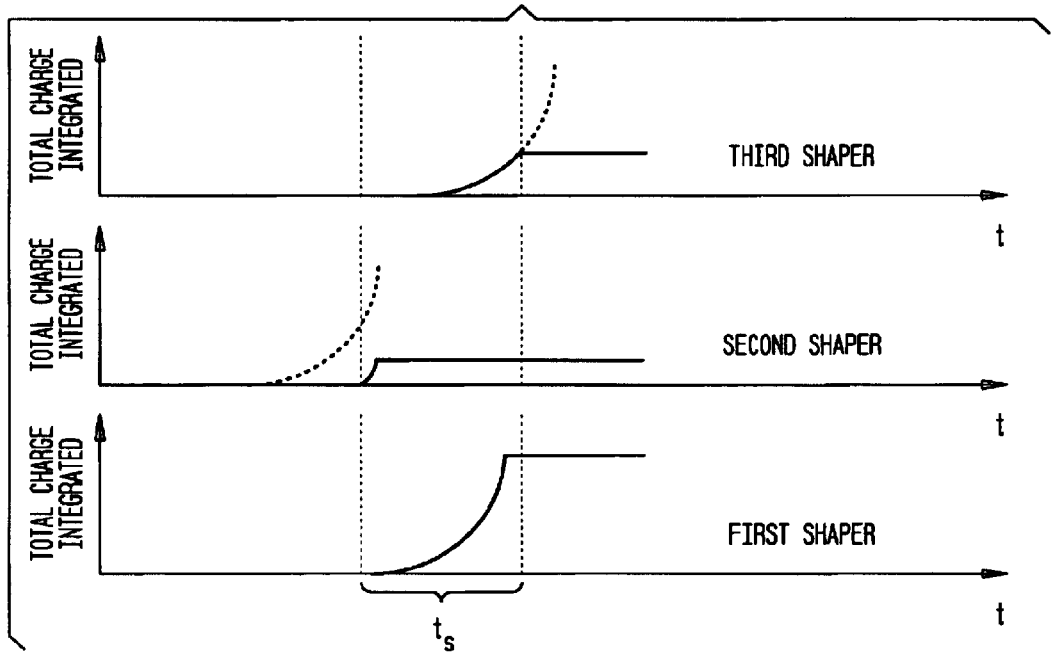
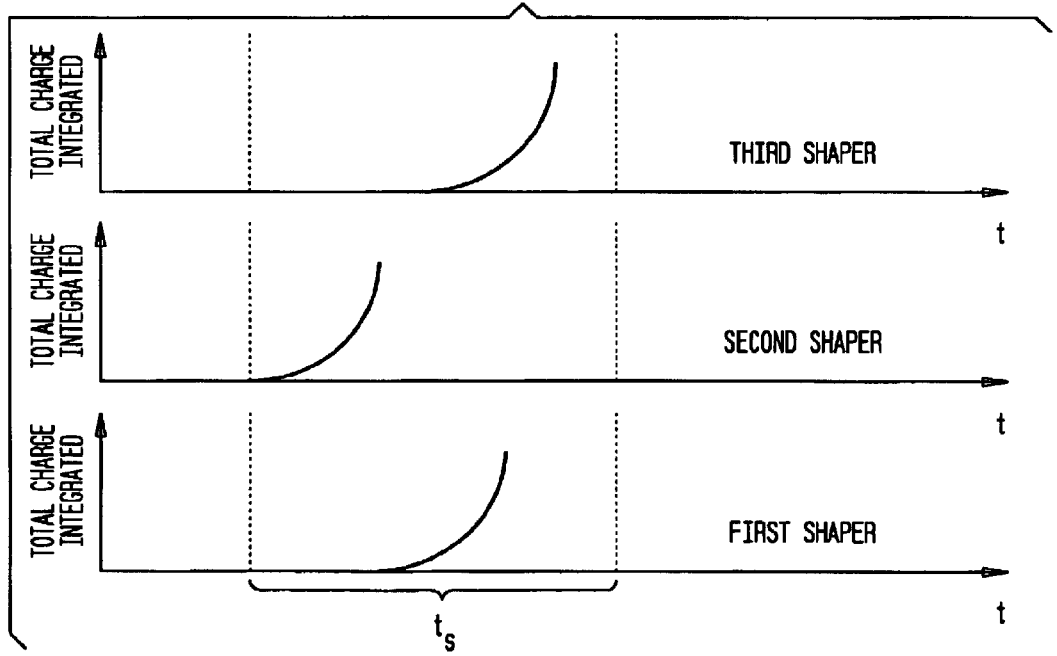

LOW NOISE, LONG INTEGRATION TIME ACQUISITION FOR RADIATION DETECTORS

BACKGROUND

The invention relates to radiation detectors in nuclear medicine and more specifically to the electronics used to detect signals from photodiodes used in some radiation detectors.

Nuclear medicine imaging assesses the radionuclide distribution within a patient after the in vivo administration of radiopharmaceuticals. The imaging systems that asses the radionuclide distribution comprise radiation detectors and associated electronics. The imaging systems detect x-ray or gamma ray photons derived from the administered radionuclides. Single photon emission imaging and coincidence imaging are two forms of nuclear medicine imaging that are currently in common use. In single photon emission imaging, the radionuclide itself directly emits the radiation to be assessed. For example, in Single Photon Emission Computed Tomography (SPECT), γ-emitting radionuclides such as $^{99}Tc$, $^{123}I$, $^{67}GA$ and $^{111}In$ may be part of the administered radiopharmaceutical. The imaging system may use a lead collimator to eliminate all photons but those photons perpendicular to the surface of the detector. The location and energy of emitted photons may then be accumulated until a satisfactory image is obtained. Coincidence imaging eliminates the need for such a collimator by relying on the detection of two photons at different detectors at nearly the same time. An example of coincidence imaging in current clinical use is Positron Emission Tomography (PET). In PET, $β^+$-emitting radionuclides such as $^{11}C$, $^{13}N$, $^{15}O$, $^{18}F$, $^{68}Ga$, $^{82}Rb$ are part of the administered radiopharmaceutical. The emitted positrons react with electrons within the patient's body, the annihilation creating two 511 keV photons emitted in opposite directions. The two photons are then detected within a certain time window, generally in the nanosecond range, of each other. Radiation detectors for nuclear medicine imaging may need to detect photons from 1 keV to several MeV in energy. Solid state detectors such as those made from Cadmium-Zinc-Telluride that convert photons of such energy directly to electrical signals are now on the market. However, solid state detectors have issues such reliability, longevity, resolution, and cost. Moreover, such systems must be cooled, adding to cost and reliability concerns.

Therefore, many radiation detectors in current use in nuclear medicine imaging systems consist of a scintillation crystal, or scintillator, for converting x-ray or gamma ray photons into visible light photons, so called scintillation photons, and a device for converting the scintillation photons into electrical signals. The Anger camera pioneered this approach in the 1950s is and more fully described in U.S. Pat. No. 3,011,057. The Anger camera consists of a NaI crystal and an array of photomultiplier tubes (PMTs). In operation, gamma ray photons cause scintillation events in the NaI crystal. The resulting scintillator photons then impinge the different PMTs. The different signals amplified by the different PMTs yield information about the location of the scintillation event within the NaI crystal.

In the current art, a variety of scintillation crystals may be used, depending on how the crystal is to be used (e.g., SPECT or PET), cost, reliability, resolution and speed of imaging. Crystal material includes sodium iodide (NaI), cesium iodide (CsI), barium germanate (BGO), barium fluoride ($BaF_2$), lutetium oxyorthosilicate (LSO), and others.

Regardless of the scintillator, the scintillation photons produced must be converted into an electrical signal to be analyzed. PMTs are still often used. A PMT is a vacuum tube including a photocathode, and an electron multiplier sealed into an evacuated glass tube, and an input window which is optically coupled to the scintillation crystal. Scintillation photons (4 or 5) incident on the photocathode cause the photocathode to emit an electron. The electron is absorbed by a dynode which emits 5–6 electrons. A series of dynodes repeat this reaction until a final large cluster of electrons is fed through the anode as a pulse to the attached logic circuits to determine position.

PMTs are extremely sensitive to low levels of light. However, PMTs have many drawbacks. PMTs require a high voltage for operation, typically greater than 1000V. PMTs are vulnerable to drifting in performance, especially early in their life cycle. PMTs are susceptible to mechanical failure and may thus be less reliable. PMTs are susceptible to magnetic fields, such as from the MRI devices (and even from the earth's comparatively weak magnetic field). PMTs are physically bulky. The size of the PMTs determines and limits the intrinsic spatial resolution of a detector system. Furthermore, PMTs require lead shielding, thus increasing the weight of the overall camera. This increases costs, especially in the case the camera must be moved by motors for tomographic imaging.

In addressing the above problems, photodetectors composed of an array of solid state photodiodes have been used rather than PMTs. See, for example, U.S. Pat. No. 5,171,998. Inorganic photodiodes, generally various forms or compounds of silicon, address some of the problems of the PMTs. The inorganic photodiodes are more stable over their life cycle, more robust mechanically, not susceptible to magnetic fields, and much smaller and lighter. However, inorganic photodiodes have their own disadvantages. They are expensive, difficult, and slow to fabricate. Their mechanical structure is rigid. Inorganic photodiodes are susceptible to radiation damage. Inorganic photodiodes generally have a poor spectral response to long wavelength scintillation photons from certain scintillation crystals, such as CsI. Finally, the low band gap of silicon based photodiodes yields thermally generated leakage current, which acts as noise in associated circuits which read the signal from the inorganic photodiodes. The silicon photodiodes must be cooled to lower such leakage current to acceptable levels.

The use of carbon-based photodiodes in lieu of inorganic photodiodes has been disclosed in co-pending, commonly assigned U.S. patent application Ser. No. 10/369,944 filed Feb. 19, 2003, entitled Carbon-Based Photodiode Detector for Nuclear Medicine by Brabec et al. The many advantages of using an array of carbon-based photodiodes in a photodetector are discussed in the co-pending application. One such advantage is a substantially lower leakage current (or "dark" current) than found in current inorganic photodiodes. Such substantially lower leakage current is due to the higher band gap seen in carbon-based photodiodes. However, the capacitance of such photodiodes is substantially increased.

Current front-end electronics coupled to radiation detectors using silicon photodiodes have been optimized to minimize noise and thus maximize energy resolution. However, the application of the same front-end electronics to radiation detectors using carbon-based photodiodes fails to yield substantial improvements in energy yield due to the reduced noise from the leakage current. Thus their remains a need in the radiation detector art for front-end electronics that take advantage of the different electrical characteristics of low leakage current photodiodes, and carbon-based photodiodes in particular.

In accordance with an embodiment of the present invention, a method of selecting an integration time is used for a number of shaper circuits of a radiation detector system having a scintillator optically coupled to an array of low leakage current photodiodes. The lower and upper limit on the range of integration times is determined, and then selecting the integration time within the range of integration times without further regard to the energy resolution to the system.

In accordance with an embodiment of the present invention, a radiation detector having a scintillator, an array of low leakage noise photodiodes optically coupled to the scintillator, and a number of shaper circuits. Each shaper circuit is electrically coupled to one photodiode of the array of photodiodes. Each of the number of shaper circuits has an integration time that is within a range of integration times within which energy resolution is not a consideration.

In accordance with an embodiment of the present invention, a low noise radiation detector for generating a signal having both parallel and serial noise triggered by an x-ray or gamma ray events. The radiation detector includes a photodetector having an array of carbon-based photodiodes and a shaper circuit electrically coupled to the photodetector. The shaper circuit has an integration time wherein which is greater than the integration time of another shaper circuit of another radiation detector having another photodiode including an array of silicon-based photodiodes.

In accordance with an embodiment of the present invention, a low noise radiation detector system having a gantry and a radiation detector head mounted on the gantry. The radiation detector includes a scintillator and a photodetector having an array of carbon-based photodiodes. The radiation detector further includes associated electronics such as a shaper circuit electrically coupled to the photodetector. The system also includes a computer in communication with the radiation detector. The integration time of the shaper circuit is greater than the integration time of another shaper circuit of another radiation detector having another photodiode including an array of silicon-based photodiodes.

In accordance with an embodiment of the present invention, a method of selecting a range for the integration time of a shaper circuit of a radiation detector system having low leakage current photodiodes, The method includes determining the ballistic integration time which is the integration time at which the ballistic deficit has negligible effect and determining the noise integration time which is the integration time at which the parallel noise and series noise are approximately equal. Then the method includes selecting a lower limit of the integration time as the greater of the ballistic and noise integration time and determining an upper limit of the integration time. The upper limit of the integration time is not derived from the parallel noise of the radiation detector system.

BRIEF DESCRIPTION OF THE DRAWINGS

The above description, as well as further objects, features and advantages of the present invention will be more fully understood with reference to the following detailed description of the preferred embodiments, when taken in conjunction with the accompanying drawings, wherein:

FIG. 8 is a graph of integrated charge versus shaping time in a short shaping time simultaneously triggered radiation detector system.

FIG. 9 is a graph of integrated charge versus shaping time in a long shaping time simultaneously triggered radiation detector system.

DETAILED DESCRIPTION

Figure 1:
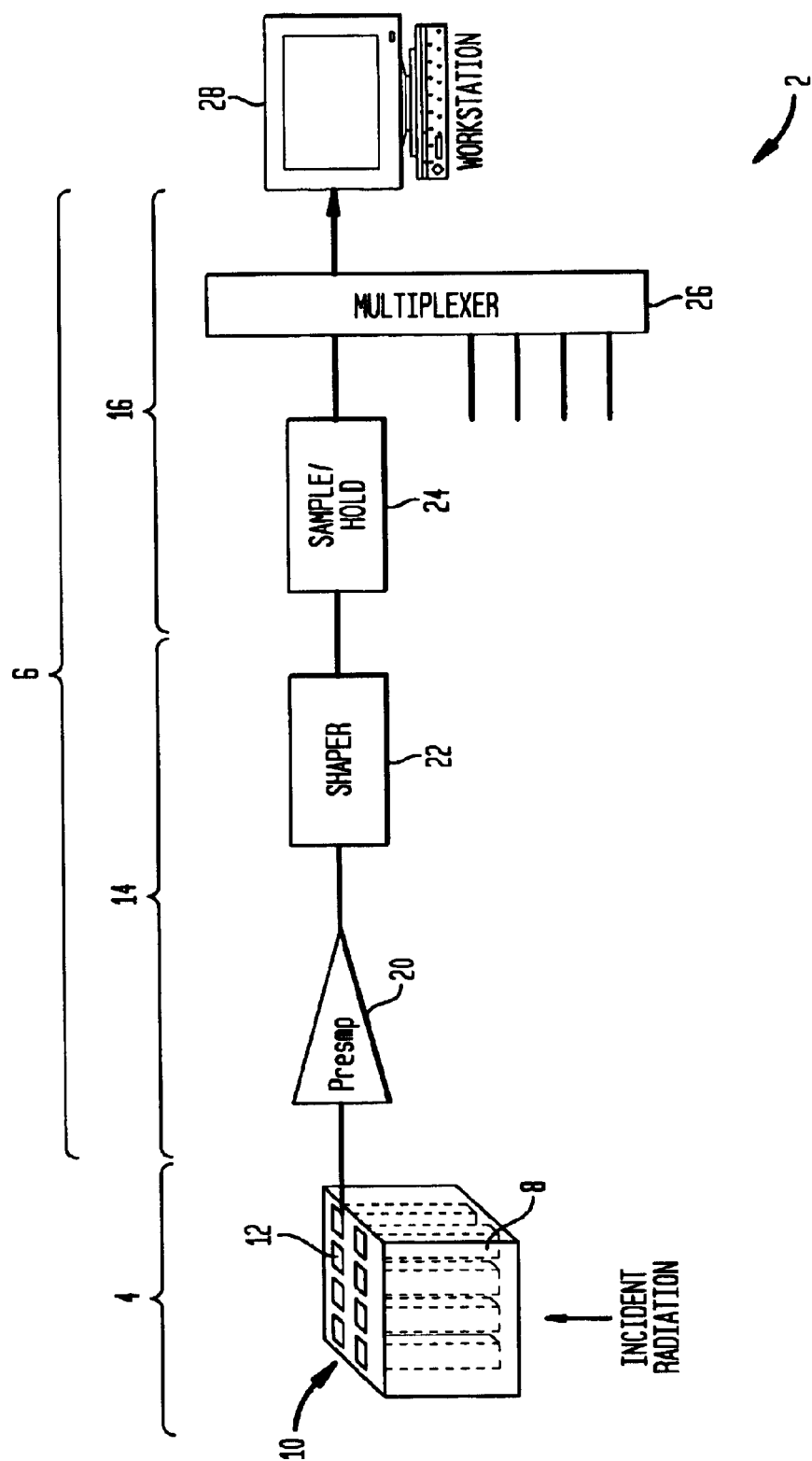
FIG. 1 is a side view of a radiation detection system.

FIG. 1 shows a radiation detector 2 having a radiation detector module 4 and associated electronics 6. The radiation detector module 4 has a scintillator 8 and an array of photodiodes 10 optically coupled to the scintillator 8. The array of photodiodes is composed of individual photodiodes such as photodiode 12. Each photodiode may be referred to as a "pixel" of the array of photodiodes 10. The array of photodiodes 10 is electrically coupled to associated electronics 6. The associated electronics 6 include the front-end electronics 14 and the read-out electronics 16. The read-out electronics 16 may be in communication with a computer 18. The front-end electronics 14 may include a preamplifier 20 if the output current if the array of photodiodes 10 is low. A shaper circuit 22 may be electrically coupled to the preamplifier circuit 20. The read-out electronics 16 may include a sample/hold circuit 24 for holding the signal result from shaper circuit 22. Each pixel of photodiode array 10 is itself a photodiode, and thus will need a set of preamplifier, shaper, and sample/hold circuits that are the same as the ones connected to photodiode 12. The sample/hold circuit 24 may be triggered to send the held signal to the multiplexer 26, which sorts signals from multiple pixels of the array of photodiodes 10, or from other arrays of photodiodes. The signal from the multiplexer 26 is then communicated to a computer 28 or other logic circuits for positional analyses and other calculations.

During operation, an x-ray or gamma ray event within the scintillator 8 generates scintillation photons in the visible spectrum. The scintillation photons which impinge a pixel of the photodiode array 10 generate a current. The current may be amplified by the preamplifier 18 for further processing. The current is then integrated over a shaping time ($t_s$) (also known as the "shaper peaking time" or "integration time") by the shaper circuit 22. The current pulse from a photodiode such as photodiode 12 is amplified by preamplifier 20 and then accumulated, either by a capacitor or other means known in the art, over an integration time $t_s$. The resulting signal is a shaped pulse with peak amplitude related to the amount of charge accumulated over the integration time $t_s$. Typically, the amplitude of the pulse is proportional to the amount of accumulated charge. However, this relationship is not always linear.

Figure 2:
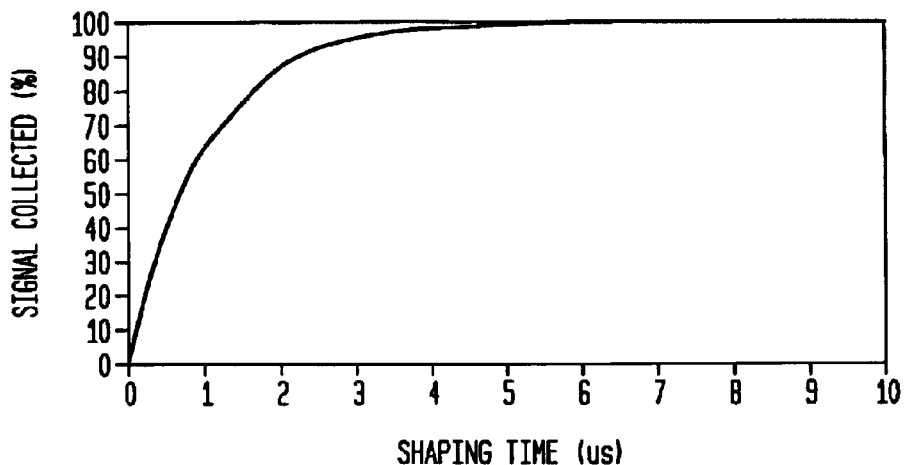
FIG. 2 is a graph of integration time versus signal collected which shows the phenomena of ballistic deficit in a prior art system.

The duration of the current from the photodiode 12 depends on the detector decay time, which is an intrinsic detector property. This time is equivalent to the collection time ($t_c$) of the current. However, making the integration time $t_s$ equal to the collection time $t_c$ is not sufficient to maximize the amount of signal collected from the current and converted into the pulse output of the shaper 22. Ballistic deficit is defined as a loss of integrated signal due to a small integration time relative to the collection time. As the shaping (integration) time decreases (for a given collection time), the ballistic deficit increases. However, as the integration time increases, the ballistic deficit asymptotically disappears. FIG. 2 shows the phenomena of ballistic deficit for CsI(TI)/photodiode detector. In this model, the shaper circuit is assumed to be of the first order. The detector decay time is assumed to be 1 $\mu$s. A shaping time $t_s$ equal to the collection time $t_s$ will yield a peak approximately equal to a third of the signal received. In general, the shaping time should be at least five times larger than the collection time ($5t_c \leq t_s$) in order for the peak of the resulting shaped pulse to be in proportion to the energy of the absorbed photon collected over the collection time.

Figure 3:
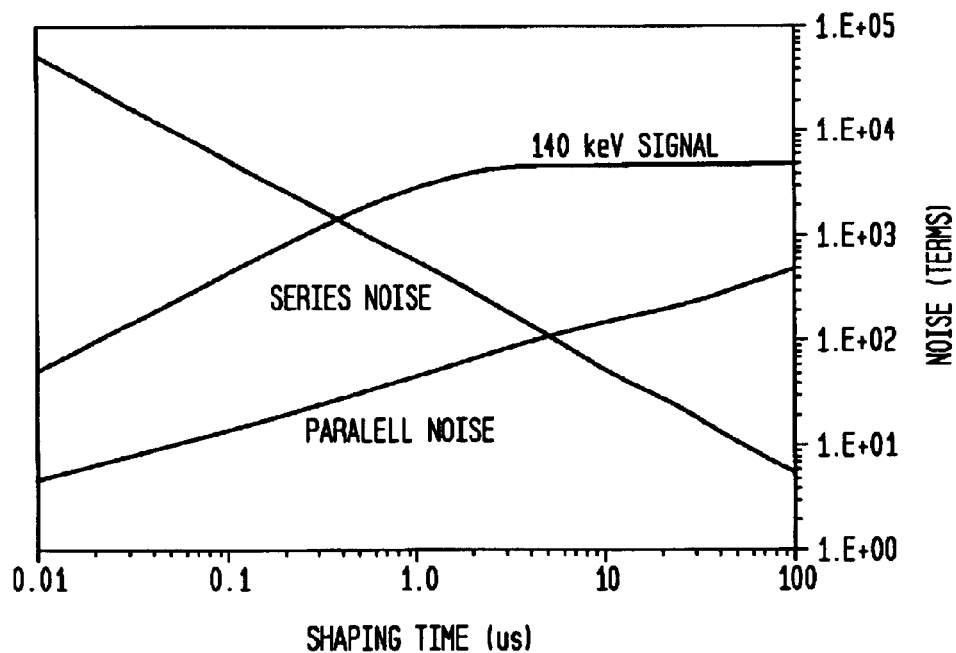
FIG. 3 is a graph of energy resolution versus noise for the prior art system.

Ballistic deficit and noise from both the radiation detector module 4 and front-electronics 14 may define some limits on the possible shaping time used in a radiation detector system. FIG. 3 shows how noise in radiation detector 2 decreases the energy resolution of the detector system 2. The noise is given in number of electrons root mean square. This is a statistical measurement of the fluctuation of the signal due to noise. Energy resolution is the capability of a detecting system to separate two different photon energies. The energy resolution is given as a Percentage of the Full Width of a peak at Half the peak's Maximum. A lower percentage means a tighter pulse, which means a more accurate measurement.

The origin of noise in the associated electronics 6 includes thermal noise, shot noise, g-r noise and low frequency noise. The thermal noise, which arises from the detector leakage (or dark) current, can be modeled as a parallel noise source. The shot noise, which is dependent on the detector capacitance, can be modeled as a series noise source. The detector 4, as part of the modeled electrical system, may be considered primarily the photodiode array 10. The leakage current is the current present primarily due to thermal excitation of electrons across the band gap of the photodiode.

Figure 4:
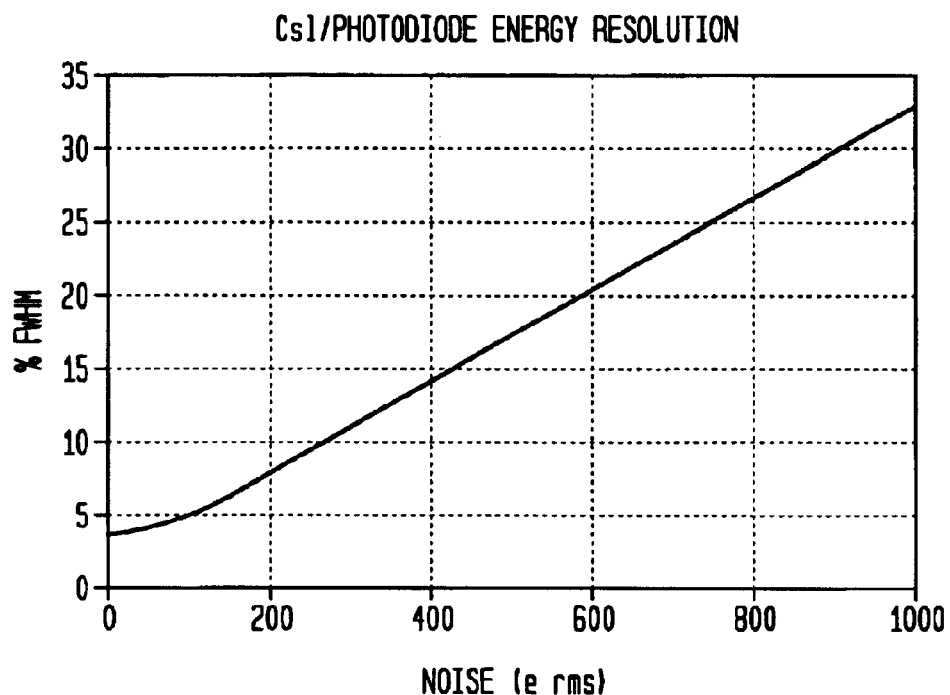
FIG. 4 is a graph of the parallel and series noise and the detector signal versus integration time in a prior art radiation detector system.
Figure 5:
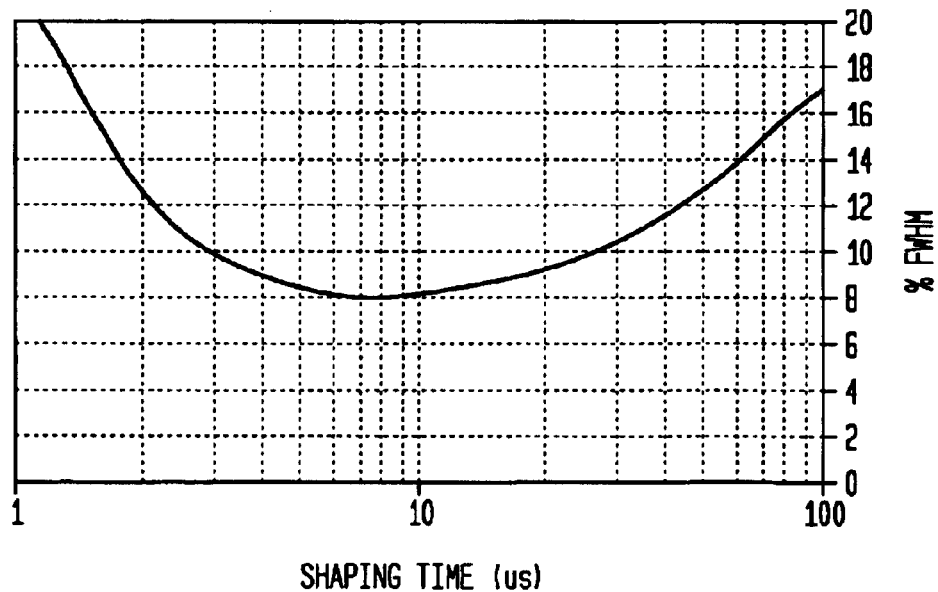
FIG. 5 is a graph of energy resolution versus integration time for a prior art radiation system.

The amount of parallel noise in the signal output of shaper circuit 22 is proportional to the shaping time. The amount of series noise in the signal output from the shaper circuit 22 is inversely proportional to the shaping time. Summed together, series and parallel noises are a major portion of the total noise of the system. FIG. 4 shows the series and parallel noise and detector signal of a CsI(TI)/Si PIN Photodiode detector with a 2 mm×2 mm detector size. Clearly, there is a shaping time at which the total noise is minimized. This optimum occurs when the series and parallel noises of FIG. 4 are approximately equal. A shaping time that minimizes total noise will tend to improve the energy resolution of the radiation detector. FIG. 5 shows the shaping time versus energy resolution for the same system. In this particular example, the optimum shaping time is 5 $\mu$s.

In this particular example of the present invention, carbon-based photodiodes are used as the radiation detectors. This causes several important changes in the relevant electrical characteristics of the detector block 4, which requires changes in the front-end electronics 14 in order to minimize noise. Table 1 summarizes the differences in the electrical characteristics between carbon-based and inorganic photodiodes. Note that the data for the Carbon Based PIN Photodiode is subject to rapid change due to continued research in the field. The data for the Inorganic PIN Photodiode is taken from a Hamamatsu s-3204-05 Si PIN photo diode. The data for the Avalanche Photodiode is taken form a Hamamatsu S3884 Si APD. The data for the Silicon Drift Detector is taken from the article Proc. SPIE, vol. 4141:97–110, 2000.

TABLE 1

|  | Carbon Based PIN Photodiode | Inorganic PIN Photodiode | Inorganic Avalanche Photodiode | Inorganic (Silicon) Drift Detector |
|---|---|---|---|---|
| Dark Current (nA/cm$^2$) | .025 | 4.6 | 15.3 | 1.0 |
| Detector Capacitance (pF/cm$^2$) | 250 | 24.7 | 483 | .15 |

Figure 6:
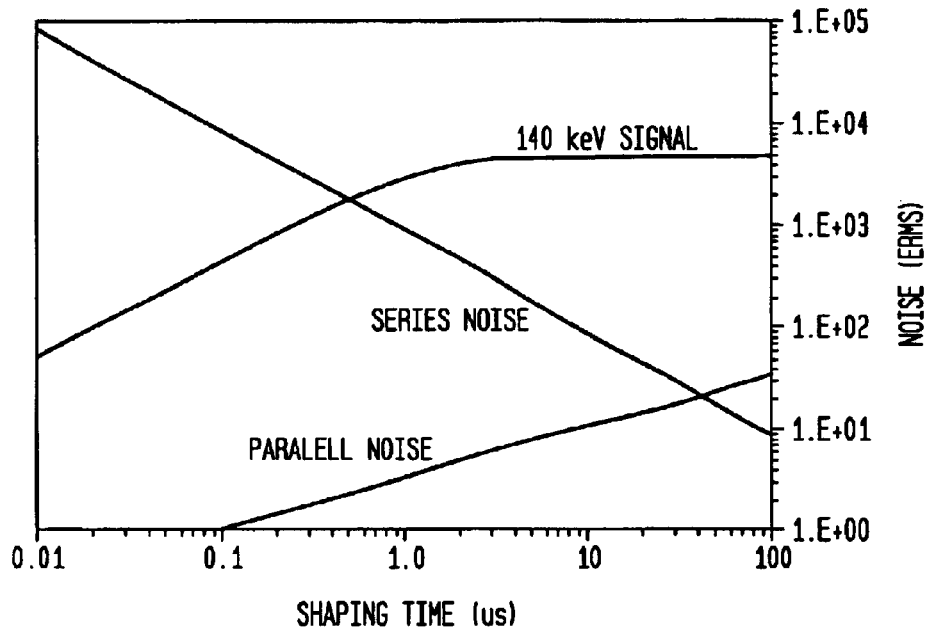
FIG. 6 is a graph of the parallel and series noise and the detector signal versus integration time in one embodiment of the present invention.
Figure 7:
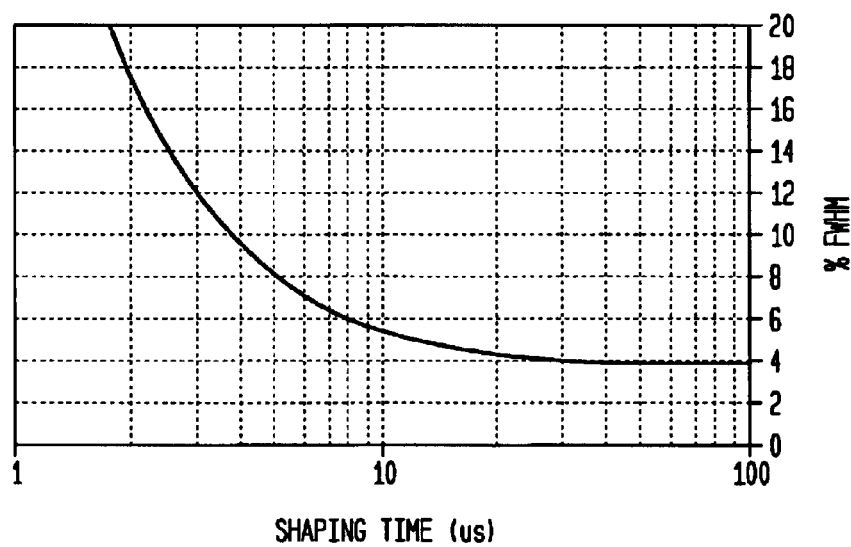
FIG. 7 is a graph of energy resolution versus integration time in one embodiment of the present invention.

The increase in detector capacitance creates more series noise in radiation detector 2. But the decrease in dark current decreases the amount of parallel noise in radiation detector 2. FIG. 6 shows the series and parallel noise, and detector signal versus shaping time for a model system having a CsI(TI)/Carbon-based PIN Photodiode detector with a 2 mm×2 mm pixel size. Note that the change in series and parallel noises indicates that the optimum shaping time is on the order of 40 $\mu$s to 50 $\mu$s. FIG. 7 shows the energy resolution versus shaping time and demonstrates that increasing the shaping time will yield an improved energy resolution.

If the shaping time of the shaper circuit 22 is 5 $\mu$s as in the prior art shaper circuit, an energy resolution of 8% is achieved. This is the optimum possible for the prior art detector system as shown in FIG. 5. However, by applying the new shaper time in the shaper circuit 22, an improved energy resolution of 4% may be achieved. Thus, using a shaper time an order of magnitude larger yields improved energy resolution.

However, the very low leakage current available in carbon-based photodiodes allows more than an improved energy resolution. FIG. 7 demonstrates that for a large range beyond an optimum 40–50 $\mu$s there is no significant degradation of energy resolution due to accumulation of parallel noise by the increasing the shaping time. As the series noise at these large shaping times is no longer significantly increasing the total noise of the system, the primary reason for the accumulation of noise as the shaping time increases is parallel noise accumulated from the leakage current. Due to the low level of the leakage current, shaping times far above the theoretical optimum of when the series and parallel noise are equal are possible without significant loss to the energy resolution of the system. This allows the shaping time to be set by considerations other than noise optimization and ballistic deficit considerations.

For example, it is typical in radiation detectors using inorganic photodiodes to use a triggering circuit to indicate when the shaper 22 should begin integrating the current pulse. Such a triggering circuit may be of many different types. For example, the leading edge of a current pulse from the photodiode may activate such a trigger. Regardless, for the short (on the order of 5 $\mu$s) shaping time typically seen used with inorganic photodiodes, the trigger is often a separate trigger circuit for each pixel in an array of photodiodes. If a trigger circuit simultaneously starts the integration of all the shaper circuits in a radiation detector using a short shaping time, it is likely that a large amount of the total signal generated by scintillation events will be lost. This is due to the frequent occurrence of the "cut-off" effect in a short shaping time regime where the shaper circuits are triggered simultaneously.

In this cut-off effect, a current pulse from a photodiode is not completely integrated within the shaping time, but rather is only partially integrated either by being caught by the beginning of the integration time or the end. An illustration of this issue is shown in FIG. 8. The charge accumulation from three different photodiodes in three different shaper circuits is shown, where the sample time $t_s$ has the same absolute starting time and magnitude for all shaper circuits (in other words, a simultaneous trigger). In this case, we see that it is possible for a first shaper circuit to completely capture all of the current pulse from the photodiode and preamplifier, while a second shaper circuit and a third shaper circuit capture only a portion of the current pulse from their respective photodiodes. This reduces the performance of the radiation detector system.

In comparison, FIG. 9 illustrates an advantage of a long shaping time. A trigger circuit simultaneously triggers all the shaper circuits connected to an array of photodiodes. The longer shaping clearly reduces the chance that a current pulse will not be fully integrated. This improves the performance of the radiation detector. Further, such a trigger circuit will require less circuitry than independently triggering each shaper circuit.

However, one should note that one disadvantage of longer shaping times is the more frequent occurrence of "pile-up" events. A pile-up occurs when a second current pulse due to a second scintillation event in a photodiode is integrated within the shaping time $t_s$ as a first current pulse from the same photodiode. There is logic which allows discrimination between the shaped pulses integrating one or two scintillation events which may be incorporated into the associated electronics 6. More importantly, there will be a shaping time that optimizes the trade off between cut-off and pile-up events which is independent of ballistic deficit or noise considerations A further advantage of long shaping times is eliminating trigger circuits all together. Rather, the shaping circuits may be clocked at a high sample time $t_s$ such as 100 $\mu$s. Again, the long shaping time avoids the need for the trigger circuit by being statistically more likely to cover any current pulses which occur.

The use of long integration times allows further advantages in the design of radiation detectors. For example, the rate at which the signal within a circuit such as the sample/hold circuit 24 may be read out is a finite time. As the integration time becomes greater, it becomes possible to guarantee that a sample/hold circuit electrically connected to a photodiode may be read out before the end of the integration time. Thus, while integration is occurring in shaper circuit 22, sample/hold circuit 24 can read out without any risk of losing signal sent to it from shaper circuit 22. In other words, there is no down time for the particular photodiode 12 during which current pulses are not recorded. This increases the count rate a given photodiode can detect.

Figure 10:
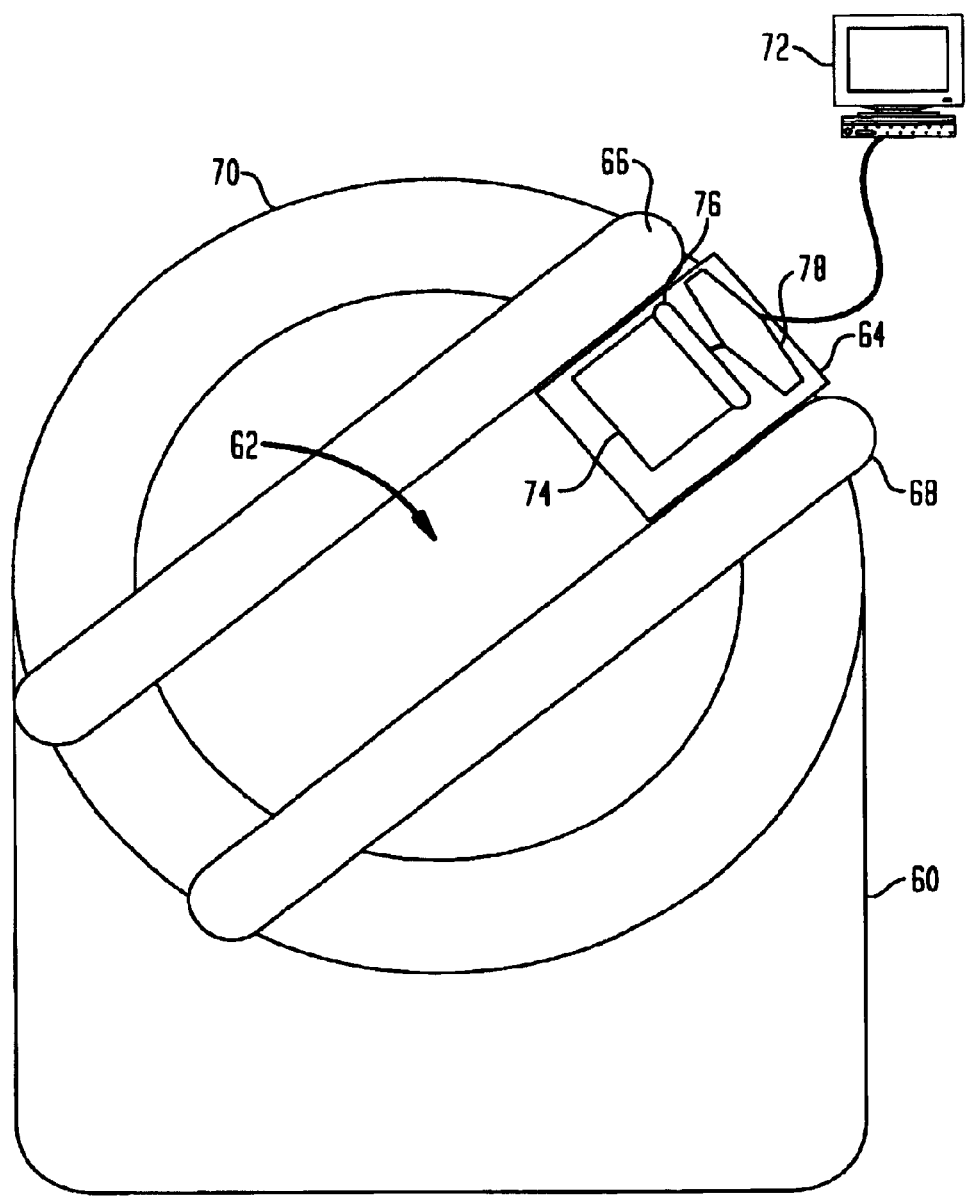
FIG. 10 is a side view of a radiation detection assembly for use with the apparatus and methods in accordance with one embodiment of the invention.

FIG. 10 is an example of an application of the carbon-based photodiodes and the improved electronics in a radiation detection assembly as might be purchased for nuclear medicine imaging in a clinical setting. The gantry 60 has an aperture 62 through which a patient may fit. The radiation detector housing 64 is mounted between tracks 66 and 68. Tracks 66 and 68 are mounted onto rotating collar 70. The radiation detector housing 64 may thus be translated along the tracks and rotated around the axis through the aperture 62. A computer 72 is in communication with radiation detector housing 64. The computer 72 is shown detached from gantry 60, but it may be integral with the gantry 60, the camera housing 64, or distributed in any manner. The radiation detector housing 64 contains a scintillator 74, a carbon-based photodiode array 76, and associated electronics 78, as described hereinabove.

As these and other variations and combinations of the features discussed above can be utilized, the foregoing description of the preferred embodiments should be taken by way of illustration rather than by limitation of the invention set forth in the claims.

What is claimed is:

1. A method of selecting an integration time for a number of shaper circuits of a radiation detector system having a scintillator optically coupled to an array of low leakage current photodiodes, comprising
    a) determining a lower limit on the range of integration times;
    b) determining an upper limit on the range of integration times; and
    c) selecting the integration time within the range of integration times without further regard to the energy resolution to the system.

2. The method of claim 1, wherein the energy resolution at any integration time within the range of integration times is either the optimum energy resolution or within allowed energy resolution degradation.

3. The method of claim 2, wherein determining the lower limit of the range of integration time comprises
    a) determining the ballistic integration time which is the integration time at which the ballistic deficit has negligible effect;
    b) determining the noise integration time which is the integration time at which the parallel noise and series noise are approximately equal;
    c) deriving the lower limit of integration times from the ballistic integration time and the noise integration time.

4. The method of claim 3, wherein determining the upper limit of the range of integration times comprises deriving the integrating time at which the parallel noise of the radiation detector system accumulates to cause energy degradation beyond the allowed energy degradation.

5. The method of claim 4, wherein selecting an integration time further comprises selecting an integration time greater than the read out time of hold circuits in the radiation detector system.

6. The method of claim 4, wherein selecting an integration time further comprises selecting an integration time which allows simultaneous start of integration by each of the number of sample circuits without substantially lowering sensitivity due to cut-off effects for a given count rate.

7. The method of claim 4, wherein selecting an integration time further comprises selecting an integration time which allows the simultaneous start of integration by each of the number of sample circuits repeatedly at the same interval without substantially lowering sensitivity due to cut-off effects for a given count rate.

8. The method of claim 3, wherein determining the upper limit comprises selecting the maximum amount of pile-up effect that may be tolerated for a given count rate, and calculating the integration time which yields this amount of pile-up effect.

9. A radiation detector comprising
a) a scintillator;
b) an array of low leakage noise photodiodes optically coupled to the scintillator;
c) a number of shaper circuits, each shaper circuit electrically coupled to one photodiode of the array of photodiodes, the number of shaper circuits having an integration time;
d) wherein the integration time is within a range of integration times within which energy resolution is not a consideration.

10. The radiation detector of claim 9, wherein the lower limit of the integration times is derived from the ballistic integration time when the ballistic deficit has negligible effect and the noise integration time when the parallel noise and series noise are approximately equal.

11. The radiation detector of claim 10, further comprising a trigger circuit which triggers all of the number of shaper circuits to begin integrating simultaneously based on the change of an electrical characteristic of the photodiode.

12. The radiation detector of claim 11, further comprising a clocking circuit which sends a pre-determined clock signal to trigger the integration of the shaping circuits independent of the array of photodiodes.

13. The radiation detector of claim 9, wherein between each of the array of photodiodes and each of the number of shaper circuits is one of a number of preamplifiers.

14. The radiation detector of claim 9, wherein each photodiode of the array of low leakage current photodiodes is a carbon-based photodiode.

15. The radiation detector of claim 9, further comprising a number of sample circuits, each sample circuit electrically coupled to one of the number of shaper circuits, wherein each of the number of sample circuits may be read out before the integration time is complete.

16. A low noise radiation detector for generating a signal having both parallel and serial noise triggered by an x or gamma ray event comprising:
a) a photodetector having an array of carbon-based photodiodes; and
b) a shaper circuit electrically coupled to the photodetector having a integration time;
c) wherein the integration time is greater than the integration time of another shaper circuit of another radiation detector having another photodiode including an array of silicon-based photodiodes.

17. The low noise radiation detector of claim 16, wherein the array of carbon-based photodiodes generates less parallel noise than the array of silicon-based photodiodes.

18. A low noise radiation detector system comprising:
a) a gantry;
b) a radiation detector head mounted on the gantry,
  i) the radiation detector including
    (1) a scintillator,
    (2) a photodetector having an array of carbon-based photodiodes, and
    (3) associated electronics including
      (a) a shaper circuit a shaper circuit electrically coupled to the photodetector having a integration time;
c) a computer in communication with the radiation detector;
d) wherein the integration time is greater than the integration time of another shaper circuit of another radiation detector having another photodiode including an array of silicon-based photodiodes.

19. A method of selecting a range for the integration time of a shaper circuit of a radiation detector system having low leakage current photodiodes, comprising
a) determining the ballistic integration time which is the integration time at which the ballistic deficit has negligible effect;
b) determining the noise integration time which is the integration time at which the parallel noise and series noise are approximately equal;
c) selecting a lower limit of the integration time as the greater of the ballistic and noise integration time; and
d) determining an upper limit of the integration time, wherein the upper limit of the integration time is not derived from the parallel noise of the radiation detector system.

* * * * *